United States Patent

Backström et al.

[11] Patent Number: 5,297,169
[45] Date of Patent: Mar. 22, 1994

[54] EQUALIZER TRAINING IN A RADIOTELEPHONE SYSTEM

[75] Inventors: Tomas Backström, Kista; Torbjörn Ward; Gustav Larsson, both of Stockholm, all of Sweden

[73] Assignee: Telefonaktiebolaget L M Ericsson, Stockholm, Sweden

[21] Appl. No.: 723,266

[22] Filed: Jun. 28, 1991

[51] Int. Cl.⁵ .............................................. H03H 7/30
[52] U.S. Cl. ...................................... 375/13; 375/85; 375/101; 379/59; 455/33.1
[58] Field of Search ................ 333/18, 28 R; 375/13, 375/99, 101, 103, 85; 455/33.1, 63, 65, 53.1, 56.1, 54.1; 379/58, 59

[56] References Cited

U.S. PATENT DOCUMENTS

| | | | |
|---|---|---|---|
| 4,445,213 | 4/1984 | Baugh et al. | 370/94 |
| 4,489,416 | 12/1984 | Stuart | 375/13 |
| 4,510,596 | 4/1985 | Hartmann et al. | 370/58 |
| 4,599,732 | 7/1986 | LeFever | 375/13 |
| 4,695,969 | 9/1987 | Sollenberger | 333/18 X |
| 4,727,429 | 2/1988 | Ueno | 358/256 |
| 4,754,273 | 6/1988 | Okada et al. | 340/825.2 |
| 4,833,693 | 5/1989 | Eyuboglu | 375/34 |
| 4,852,090 | 7/1989 | Borth | 370/104 |
| 5,119,502 | 6/1992 | Kallin et al. | 455/34.2 |

FOREIGN PATENT DOCUMENTS 2225199A 10/1989 United Kingdom .

Primary Examiner—Curtis Kuntz
Assistant Examiner—Tesfaldet Bocure
Attorney, Agent, or Firm—Burns, Doane, Swecker & Mathis

[57] ABSTRACT

Reception of a transmission in a radiotelephone system including an equalizer is improved by training the equalizer using a synchronization portion of the transmission having a data pattern chosen for its correlation properties and retraining the equalizer using a portion of the transmission transmitted for a different purpose. In particular, the portion of the transmission transmitted for a different purpose may be the digital verification color code transmitted during each burst in a digital cellular mobile radiotelephone system. Reception quality is increased by training the equalizer at more frequent intervals without increasing transmission overhead.

17 Claims, 5 Drawing Sheets

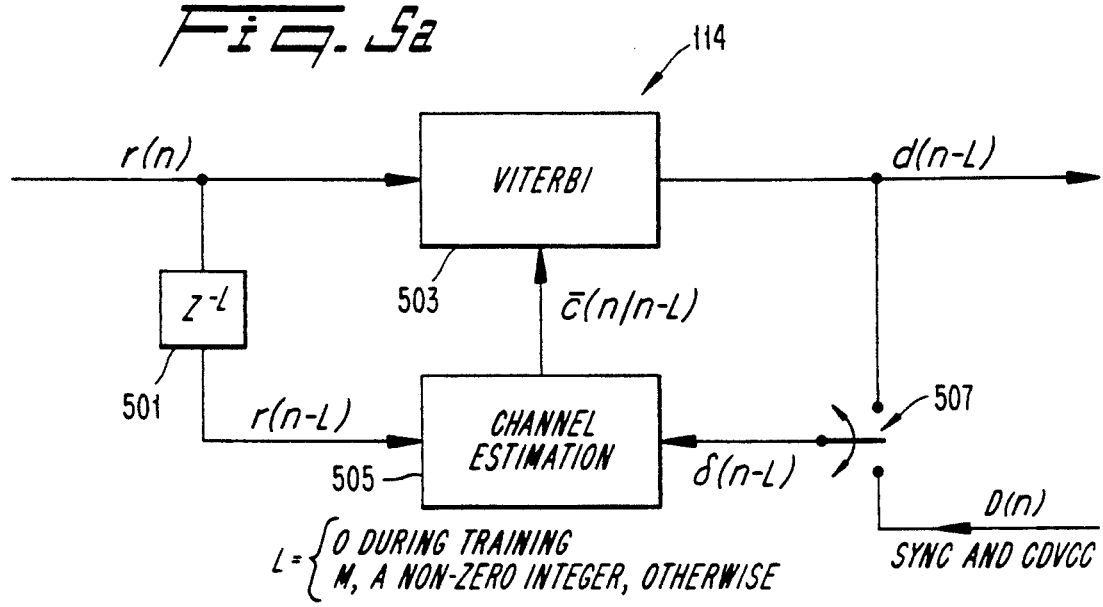
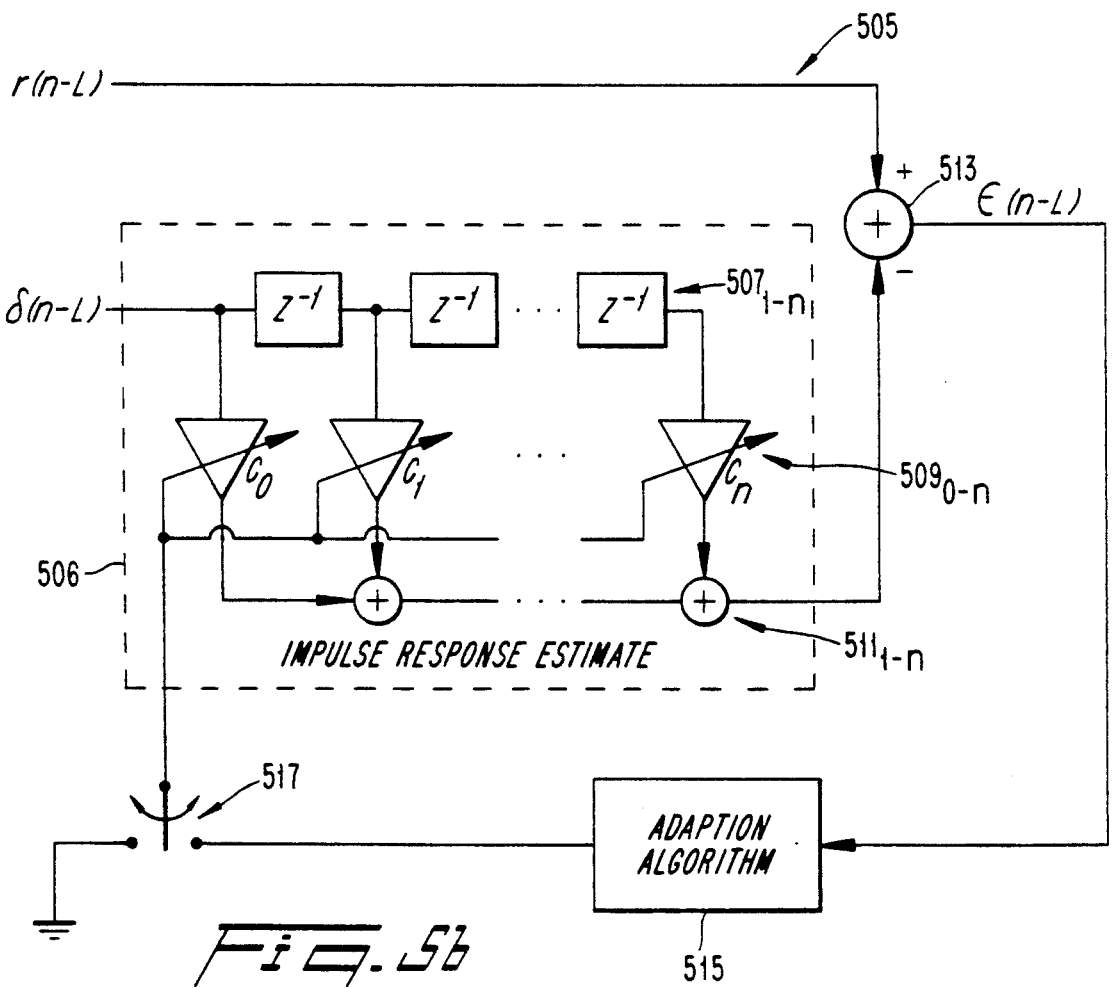

EQUALIZER TRAINING IN A
RADIOTELEPHONE SYSTEM

FIELD OF THE INVENTION

The present invention relates to equalization in a radiotelephone system to compensate for distortion introduced by a transmission medium and more particularly to improving equalization by retraining an equalizer during a transmission burst without incurring any additional transmission overhead.

BACKGROUND OF THE INVENTION

From the early days of radio, the non-ideality of the Earth's atmosphere as a transmission medium has been apparent. Radiated energy does not travel uniformly from the transmitter through the atmosphere to present a unified wave front to the receiver. On the contrary, portions of the radiated energy are reflected in many different directions by features of the terrain, non-uniformities in the atmosphere itself, and by man-made structures. Different portions of the radiated energy reach the receiver at different times along different paths resulting in a time-varying multi-path characteristic that produces, alternatively, destructive and constructive interference.

This multi-path characteristic causes a transmitted radio pulse to undergo different gain and phase variations resulting in reception of a distorted pulse. Pulse distortion from the channel medium causes interference between adjacent samples of the received signal resulting in a phenomenon known as inter-symbol interference. Inter-symbol interference can be viewed as a smearing of the transmitted pulse by the multi-path, causing overlap between successive pulses. Interference with a particular pulse can occur as a result of both past and future pulses, since the pulse is detected at the receiver after a mean path delay when the pulse is received with greatest strength. Portions of pulse energy from a past pulse that have experienced a greater than average delay may therefore interfere with a subsequent pulse, and portions of energy from a "future" pulse, i.e., a pulse that the radio receiver is not ready to detect, experiencing a less than average path delay may interfere with the present pulse being detected by the radio receive.

As is known in the art, inter-symbol interference may be greatly reduced using an adaptive equalizer. In one type of equalizer, for example, time-shifted versions of the received signal are combined with the received signal according to appropriate weights to cancel future and past interference. Such an equalizer may be constructed using a transverse filter including a tapped delay line. The appropriate weights according to which delayed signal replicas are combined with the presently received signal are arrived at during what is known as equalizer training. During equalizer training, a known sequence of symbols is transmitted and the output of the equalizer in response to the known sequence of symbols is compared to the known sequence itself. In an iterative process, an adaption algorithm optimized to minimize the difference between the detected symbol sequence and the actual symbol sequence sets the weights of the equalizer. If the weights of the equalizer are properly set, the error will be reduced to a minimum level and the equalizer will be said to have converged. If for some reasons the weights are not properly set, the error may actually increase and the equalizer will be said to have diverged.

In another well-known type of equalizer, the Viterbi equalizer, a set of complex-valued weights representing the impulse response of the communications channel is derived using a transverse filter in substantially the same manner as described above. Using the channel estimate, received pulses are detected according to the Viterbi algorithm to yield symbols of maximum likelihood given the channel estimate.

Radio channel conditions do not remain constant from one time to the next but are always changing according to atmospheric conditions as affected by the weather, etc. Accordingly, the equalizer weights have to be continually updated. Radio channel conditions change especially rapidly in a mobile radiotelephone system wherein the location of the receiver relative to the transmitter is constantly changing, perhaps at a high rate. Frequent retraining of the equalizer therefore becomes important in order to maintain sufficient reception quality.

At the same time, the transmission of known training sequences in the communications stream displaces the desired communications between the transmitter and receiver so as to increase transmission overhead. Transmission overhead reduces the effective available communications bandwidth. Bandwidth is of course a precious resource in a radiotelephone system.

Accordingly, what is needed is a way of frequently retraining an equalizer in a radio telecommunications system while minimizing transmission overhead.

SUMMARY OF THE INVENTION

According to the present invention, reception of a transmission in a radiotelephone system including an equalizer is improved by training the equalizer using a synchronization portion of the transmission having a data pattern chosen for its correlation properties and retraining the equalizer using a portion of the transmission transmitted for a purpose other than retraining. In particular, the portion of the transmission transmitted for a different purpose may be the coded digital verification color code transmitted during each burst in a digital cellular mobile radiotelephone system. Reception quality is increased by training the equalizer at more frequent intervals without increasing transmission overhead.

BRIEF DESCRIPTION OF THE DRAWINGS

FIG. 5a is a block diagram of an equalizer that may be used in the base station or mobile station; and FIG. 5b is a block diagram of a portion of the equalizer of FIG. 5a.

DETAILED DESCRIPTION OF THE PREFERRED EMBODIMENTS

Figure 1:
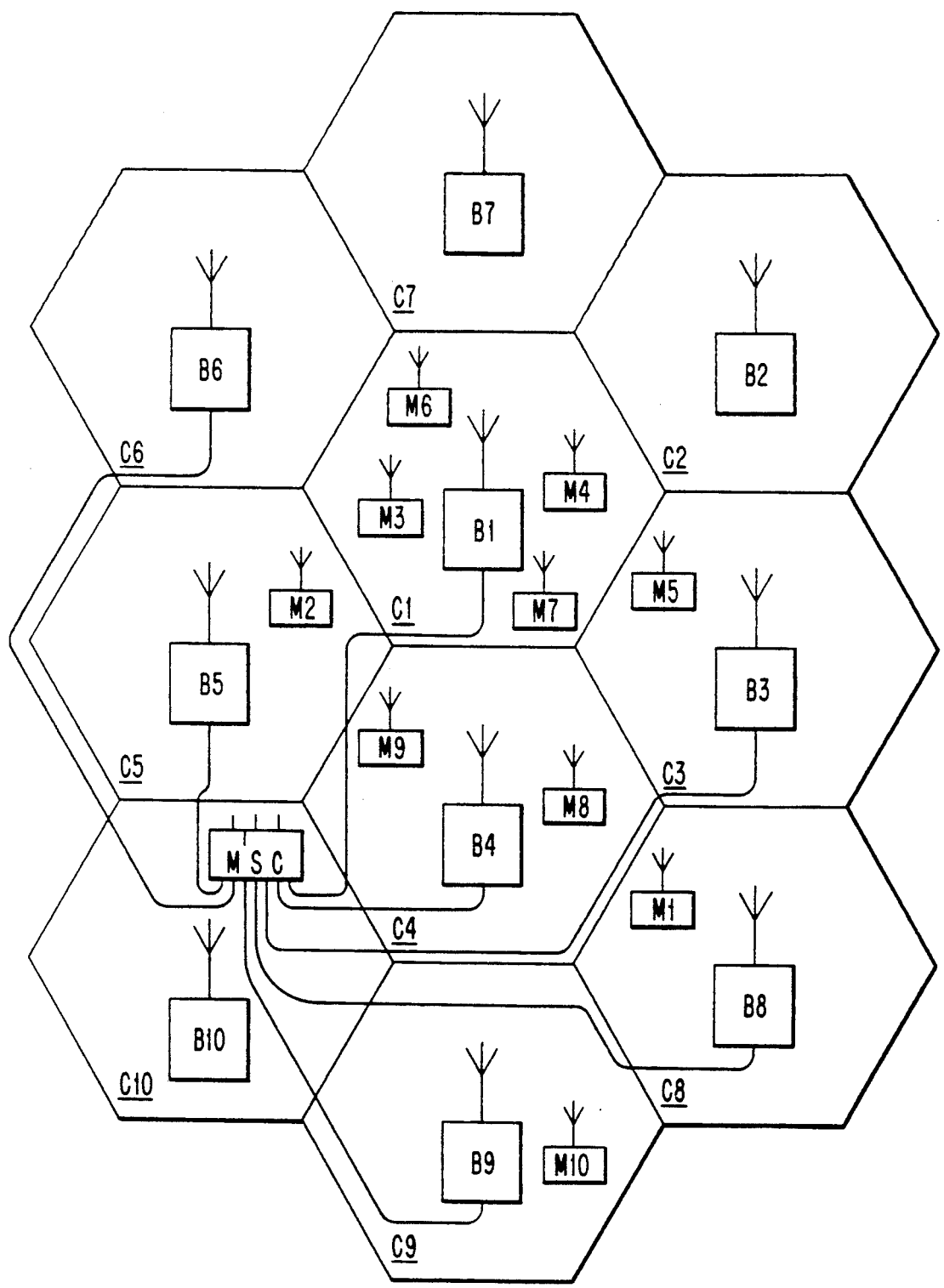
FIG. 1 is a representation of a cellular mobile radiotelephone system.

Before describing the details of the present invention, an example of the construction of a cellular mobile radio system in which the present invention can be used will be described FIG. 1 is a schematic diagram illustrating ten cells, C1 to C10, in a cellular mobile radiotelephone system. Normally the method according to the present invention would be implemented in a cellular mobile radio system comprising many more cells than ten. For purposes of this description, the system depicted herein is considered to be an isolated portion of a larger system which has been fragmented.

For each cell C1 to C10 , there is a respective base station B1 to B10. FIG. 1 illustrates base stations situated in the vicinity of the respective cell centers and having omni-directional antennas. The base stations of adjacent cells may however be located in the vicinity of cell borders and have directional antennas.

FIG. 1 also illustrates ten mobile stations M1 to M10, which are movable within a cell and from one cell to another cell. The method according to the present invention may be implemented in a cellular mobile radio system comprising many more mobile stations than ten. In particular, there are normally many more mobile stations than there are base stations.

Also illustrated in FIG. 1 is a mobile switching center MSC. The mobile switching center is connected to all ten illustrated base stations by cables. The mobile switching center is also connected by cables to a fixed public switching telephone network PSTN or similar fixed network with ISDN facilities. Not all cables from the mobile switching center to base stations and cables to the fixed network are illustrated. Further, other media may be used instead of cables for base to mobile switching center communications, e.g., fixed radio links.

The cellular mobile radio system illustrated in FIG. 1 includes a plurality of radio channels for communication. The system is designed both for analog information, e.g., speech, digitized analog information, e.g., digitized speech, and pure digital information, e.g., pure digital data. In the context of the present invention, the term connection is used for a communication channel between a mobile station and another mobile station in the same system or another system, between two fixed telephones or terminals in a fixed network connected through the cellular mobile radiotelephone system, or between a mobile station and a fixed telephone. A connection may be a call where two people talk to each other, but may also be a data communication channel where computers exchange data.

Each cellular system is assigned a particular frequency band over which it can operate. A set of communication channels is allocated to each cell. For example, between 10 and 30 different voice channels and 1 control channel may be allocated to any given cell. Different sets of communication channels must always be allocated to neighboring cells since, in order to maintain full radio coverage, cells overlap each other. Using the same channels in adjacent cells would cause co-channel interference in these overlapping areas.

Figure 2:
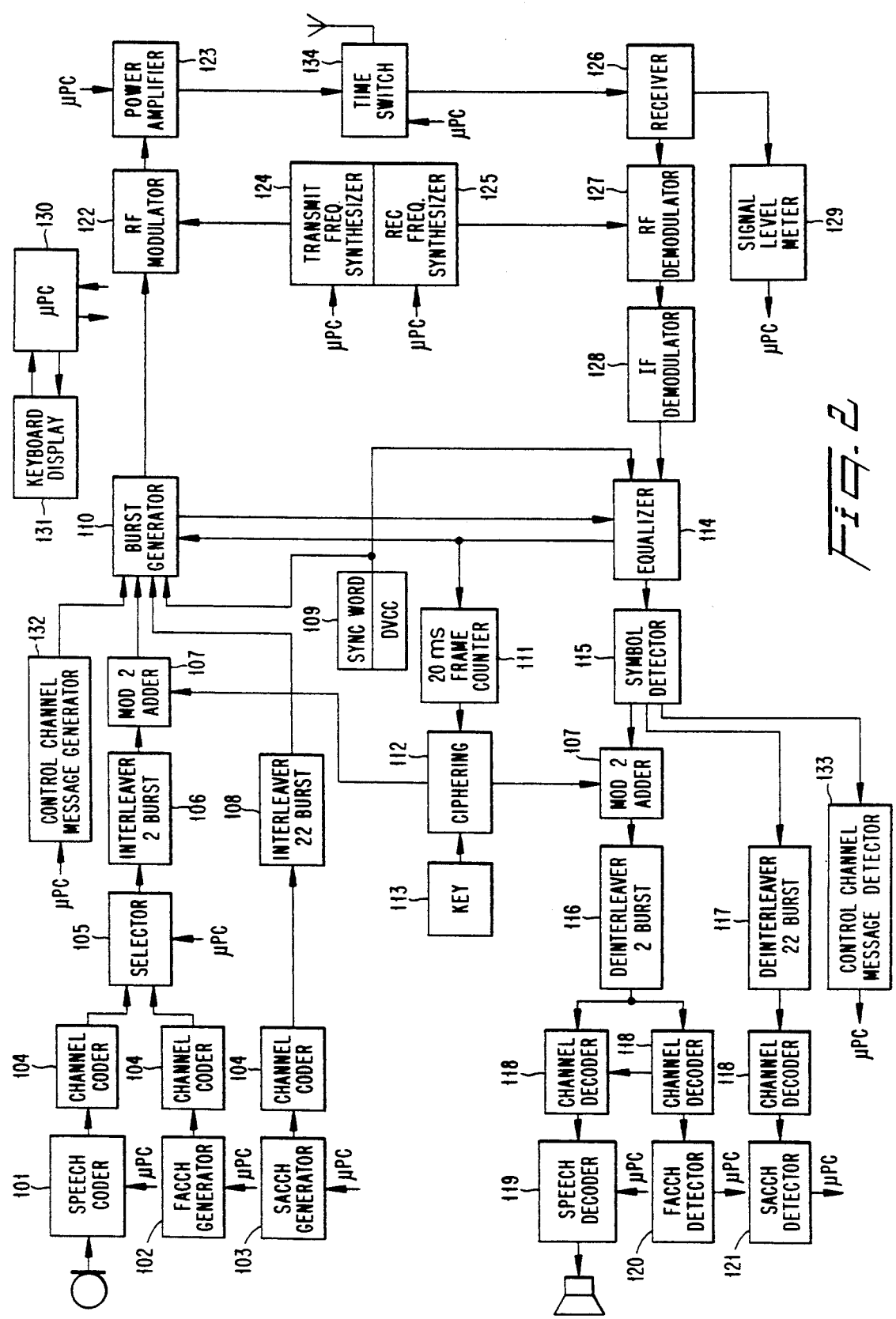
FIG. 2 is a block diagram of a mobile station that may be used in the present invention in accordance with FIG. 1.

Referring now to FIG. 2, an embodiment of a mobile station that can be utilized in a cellular telephone system that operates in accordance with the present invention is illustrated. This particular example pertains to a mobile station that can be used in a digital communications system, i.e., one in which digitized voice information is transmitted between base and mobile stations. Furthermore, the operation of the system is explained in the context of full-rate transmissions in a time division multiple access (TDMA) system, in which each packet of digital information is interleaved over two spaced time slots in a frame of data. It will be readily appreciated, however, that the invention is equally applicable to other types of cellular radio systems, such as those in which information is transmitted in an analog format, transmitted digitally at a half rate, or transmitted in other access modes such as frequency division multiple access (FDMA) or code division multiple access (CDMA).

In the mobile station depicted in FIG. 2, a speech coder 101 converts the analog signal generated by a microphone into a binary data stream. The data stream is then divided into data packets, according to the TDMA principle. A fast associated control channel (FACCH) generator 102 generates control and supervision signalling messages that are transmitted from the mobile station to the land-based system. The FACCH message replaces a user frame (speech/data) whenever it is to be transmitted. A slow associated control channel (SACCH) generator 103 provides signalling messages that are transmitted over a continuous channel for the exchange of information between the base station and the mobile station and vice-versa. A fixed number of bits, e.g., twelve, is allocated to the SACCH for each time slot of a message train. Channel coders 104 are respectively connected to the speech coder 101, FACCH generator 102, and SACCH generator 103 for manipulating the incoming data in order to carry out error detection and correction. The techniques used by the channel coders 104 are preferably convolutional encoding, which protects important data bits in the speech code, and cyclic redundancy check (CRC), wherein the perceptually significant bits in the speech coder frame, e.g., twelve bits, are used for computing a seven-bit check.

A selector 105 is connected to the channel coders 104 associated with the speech coder 101 and the FACCH generator 102, respectively. The selector 105 is controlled by a microprocessor controller 130 so that, at appropriate times, user information over a particular speech channel is replaced with system supervision messages over the FACCH. A two-burst interleaver 106 is coupled to the output of the selector 105. Data to be transmitted by the mobile station is interleaved over two distinct time slots. A packet of 260 data bits, which constitute one transmitting word, is divided into two equal parts and is interleaved over two different time slots. The effects of RAYLEIGH fading are reduced in this manner. The output of the two-burst interleaver 106 is provided to the input of a modulo-two adder 107 so that the transmitted data is ciphered bit-by-bit by logical modulo-two-addition of a pseudo-random bit stream.

The output of the channel coder 104 associated with the SACCH generator 103 is connected to a 22-burst interleaver 108. The 22-burst interleaver 108 interleaves data transmitted over the SACCH over 22 time slots each consisting of 12 bits of information.

The mobile station further includes a Sync Word/DVCC generator 109 for providing the appropriate synchronization word (Sync Word) and DVCC (digital verification color code) to be associated with a particular connection. The Sync Word is a 28-bit word used for time slot synchronization and identification. The DVCC is an 8-bit code which is sent by the base station to the mobile station and vice-versa, for assuring that the proper channel is being decoded.

A burst generator 110 generates message bursts for transmission by the mobile station. The burst generator 110 is connected to the outputs of the modulo-two-adder 107, the 22-burst interleaver 108, the Sync Word/DVCC generator 109, an equalizer 114, and a control channel message generator 132, to integrate the various pieces of information from these respective units into a single message burst. For example, according to the published U.S. standard EIA/TIA IS-54, a message burst comprises data (260 bits), SACCH (12 bits), Sync Word (28 bits), coded DVCC (12 bits), and 12 delimiter bits, combined for a total of 324 bits. Under the control of the microprocessor 130, two different types of message bursts are generated by the burst generator 110: control channel message bursts from the control channel message generator 132 and voice/traffic message bursts. The control channel message replaces the SACCH as well as the speech data normally generated in a voice/traffic burst.

The transmission of a burst, which is equivalent to one time slot, is synchronized with the transmission of other time slots, which together make up a frame of information. For example, under the U.S. standard, a frame comprises three full-rate time slots. The transmission of each burst is adjusted according to timing control provided by the equalizer 114. Due to time dispersion, an adaptive equalization method is provided in order to improve signal quality. For further information regarding adaptive equalization techniques, reference is made to U.S. patent application Ser. No. 315,561, filed Feb. 27, 1989, and assigned to the same assignee. Briefly, the base station functions as the master and the mobile station is the slave with respect to frame timing. The equalizer 114 detects the timing of an incoming bit stream from the base station and synchronizes the burst generator 110. The equalizer 114 is also operable for checking the Sync Word and DVCC for identification purposes.

A frame counter 111 is coupled to the burst generator 110 and the equalizer 114. The frame counter 111 updates a ciphering code utilized by the mobile station for each transmitted frame, e.g., once every 20 ms. A ciphering unit 112 is provided for generating the ciphering code utilized by the mobile station. A pseudo random algorithm is preferably utilized. The ciphering unit 112 is controlled by a key 113 which is unique for each subscriber. The ciphering unit 112 consists of a sequencer which updates the ciphering code.

The burst produced by the burst generator 110, is forwarded to an RF modulator 122. The RF modulator 122 is operable for modulating a carrier frequency according to the $\pi/4$-DQPSK method ($\pi/4$ shifted, Differentially Encoded Quadrature Phase Shift Keying). The use of this technique implies that the information is differentially encoded, i.e., 2-bit symbols are transmitted as four possible changes in phase: $\pm\pi/4$ and $\pm3\pi/4$. The transmitter carrier frequency supplied to the RF modulator 122 is generated by a transmitting frequency synthesizer 124 in accordance with the selected transmitting channel. Before the modulated carrier is transmitted by an antenna, the carrier is amplified by a power amplifier 123. The RF power emission level of the amplifier is selected on command by a microprocessor controller 130.

A receiver carrier frequency signal is generated in accordance with the selected receiving channel by a receiving frequency synthesizer 125. Incoming radio frequency signals are received by a receiver 126, the strength of each signal being measured by a signal level meter 129. The received signal strength value is then sent to the microprocessor controller 130. An RF demodulator 127, which receives the receiver carrier frequency signal from the receiving frequency synthesizer 125 and the radio frequency signal from the receiver 126, demodulates the radio frequency carrier signal, thus generating an intermediate frequency. The intermediate frequency signal is then demodulated by an IF demodulator 128, which restores the original $\pi/4$-DQPSK-modulated digital information.

The restored digital information provided by the IF demodulator 128 is supplied to the equalizer 114. A symbol detector 115 converts the received two-bit symbol format of the digital data from the equalizer 114 to a single-bit data stream. The symbol detector 115 in turn produces three distinct output signals. Control channel messages are sent to a control message detector 133 which supplies detected control channel information to the microprocessor controller 130. A modulo-two adder 107 and a two-burst deinterleaver 116 reconstruct the speech data/FACCH data by assembling and rearranging information from two time slots of the received data. The symbol detector 115 supplies SACCH data to a 22-burst deinterleaver 117. The 22-burst deinterleaver 117 reassembles and rearranges the SACCH data spread over 22 consecutive frames.

The two-burst deinterleaver 116 provides the speech data/FACCH data to two channel decoders 118. The convolutionally encoded data is decoded using the reverse of the above-described coding principle. The received cyclic redundancy check (CRC) bits are checked to determine if any error has occurred. The FAACH channel coder furthermore detects the distinction between the speech channel and any FACCH information, and directs the channel decoders 118 accordingly. A speech decoder 119 processes the received speech data from the channel decoder 118 in accordance with a speech coder algorithm (e.g., VSELP), and generates the received speech signal. The analog signal is finally enhanced by a filtering technique. Messages on the fast associated control channel are detected by a FACCH detector 120, and the information is transferred to the microprocessor controller 130.

The output of the 22-burst deinterleaver 117 is provided to a separate channel decoder 118. A SACCH detector 121 detects messages on the slow associated control channel and transfers that information to the microprocessor controller 130.

The microprocessor controller 130 controls the mobile station activity and the base station communication, and also handles the terminal keyboard input and display output 131. Decisions by the microprocessor controller 130 are made in accordance with received messages and measurements that are made. The keyboard and display unit 131 enable information to be exchanged between the user and the base station.

Figure 3:
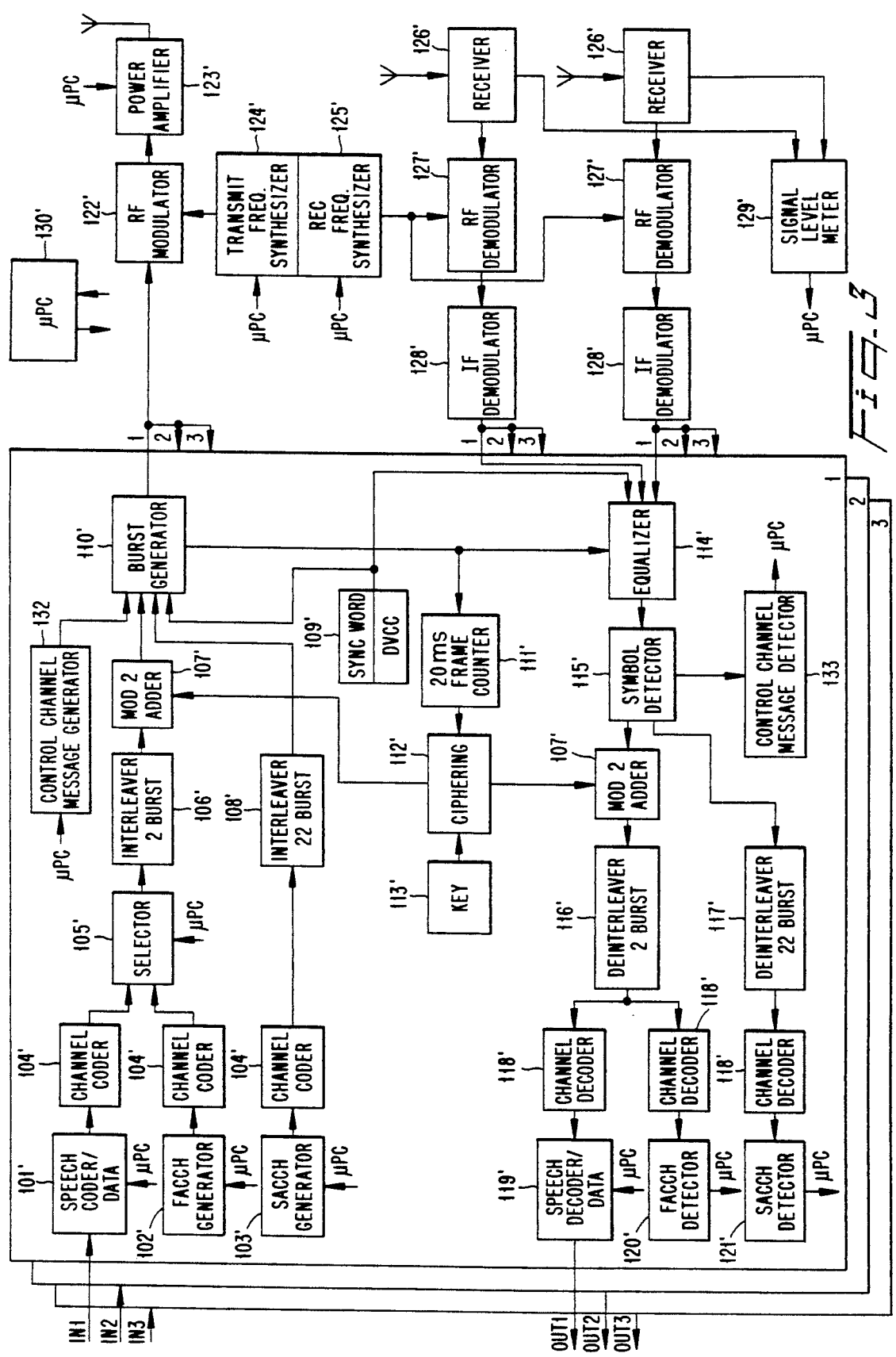
FIG. 3 is a block diagram of a base station that may be used in the present invention in accordance with FIG. 1.

FIG. 3 illustrates an embodiment of a base station that can be utilized in a cellular telephone system that operates in accordance with the present invention. The base station incorporates numerous component parts which are substantially identical in construction and function to component parts of the mobile station illustrated in FIG. 2 and described in conjunction therewith. Such identical component parts are designated in FIG. 3 with the same reference numerals utilized hereinabove in the description of the mobile station, but are differentiated therefrom by means of a prime (') designation.

There are, however, some distinctions between the mobile and base stations. For instance, the base station has two receiving antennas. Associated with each of these receiving antennas are a receiver 126', an RF demodulator 127', and an IF demodulator 128'. Furthermore, the base station does not include a user keyboard and display unit 131 as utilized in the mobile station.

Figure 4A:
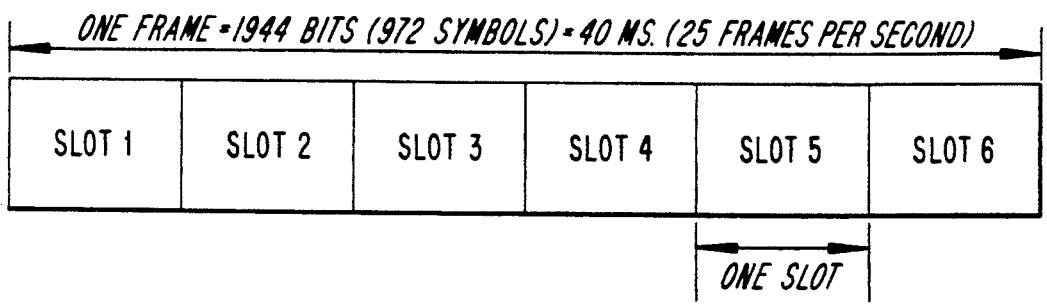
FIG. 4a is a diagram of a frame structure that may be used for communications between the base station and the mobile station.

TDMA communications between the base station and a plurality of mobile stations may be structured according to the frame structure illustrated in FIG. 4a. Six time slots of equal duration combine to form one frame, each time slot being allocated to a different mobile station. In a preferred embodiment, the frame has an overall duration of 40 ms for a frame rate of 25 frames per second.

Figure 4B:
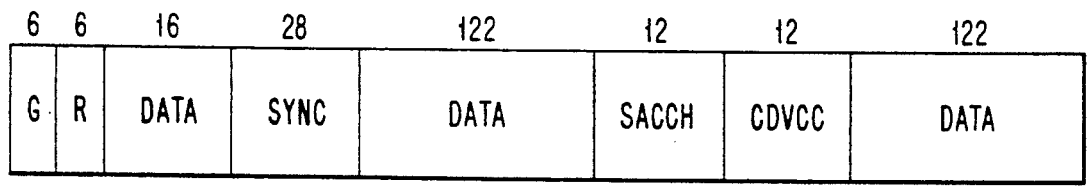
FIG. 4b is a diagram of a slot format for communications from the mobile station to the base station.
Figure 4C:
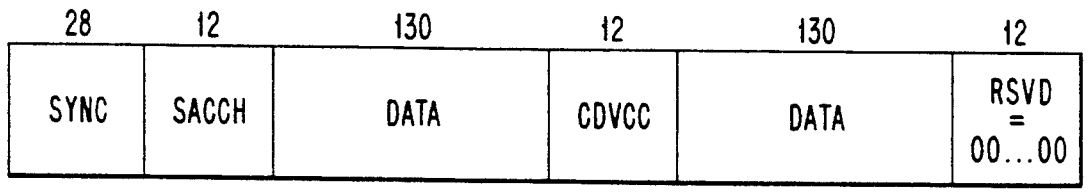
FIG. 4c is a diagram of a slot format that may be used for communications from the mobile station to the base station.

The slot format for TDMA communications between the base station of FIG. 2 and the mobile station of FIG. 3 may be as illustrated in FIGS. 4b and 4c. FIG. 4b illustrates the slot format from the mobile station to the base station, whereas FIG. 4c illustrates the slot format from the base station to the mobile station. Proceeding with the description of the fields of FIG. 4b, each field representing an area containing specified information, the field G represent a guard time used to separate the present transmission burst from the previous transmission burst, and the field R represents a ramp time necessary to fully activate the radio transmitter. A short data field then precedes a synchronization field, followed again by a longer data field. The field SACCH is used to realize a slow associated control channel for transmission of control or supervision messages between the mobile station and the base station. The field CDVCC is used to transmit a coded digital verification color code used to distinguish different channels in the mobile radiotelephone system. The final field is again a data field. Except for the guard and ramp fields, the base station to mobile station slot format contains substantially the same fields but arranged somewhat differently.

The equalizer 114 of the base station of FIG. 2 and the mobile station of FIG. 3 may be of a construction illustrated in FIG. 5a. A Viterbi (maximum-likelihood) detector receives pulses r(n) from the communications channel, n denoting a symbol time, and produces corresponding maximum-likelihood symbols d(n-L), delayed L symbol times with respect to the received pulses, using a channel estimate $\bar{c}(n|n-L)$ from the channel estimator 505. The channel estimate is an estimate of the current impulse response of channel at symbol time n given pulses received L symbol times previously and the corresponding detected maximum-likelihood symbols. The received pulses r(n) are therefore input to the channel estimator 505 via a delay element 501 having a delay of L symbol times, and the output d(n-L) of the Viterbi detector 503 is input directly to the channel estimator 505 through a switch 507. The Viterbi detector 503 may be realized using a suitably programmed digital signal processor in a manner well-known in the art.

During equalizer training, a known symbol sequence D(n) is input to the channel estimator 505 through the switch 507 instead of the detected maximum-likelihood symbols d(n-L), in which some errors inevitably occur. The switch 507 is controlled by the aforementioned digital signal processor (not shown) in accordance with the preestablished frame structure of FIG. 4 based on a continuously updated symbol counter maintained by the digital signal processor. The symbols input to the channel estimator 505, detected in the case of normal reception or known in the case of equalizer training, are designated $\delta(n-L)$. During training, L=0 such that the received pulses r(n) and the known pattern D(n) are input to the channel estimator without any delay. During training, the Viterbi detector 503 does not detect symbol values. During normal reception, L=M, a non-zero integer determined by the particular implementation of the Viterbi detector 503 in a manner well-known in the art.

The channel estimator 505 is shown in greater detail in FIG. 5b. A transversal filter 506 is used to model the impulse response of the communications channel. Complex-valued symbols $\delta(n-L)$ are input to a tapped delay line, each of the taps being separated by a delay element $507_{1-n}$ having a constant delay T equal to the communications symbol period. A set of complex-valued weights $C_0$-$C_n$ representing the channel impulse response estimate is applied to the taps through amplitude-and-phase controlled amplifiers $509_{0-n}$, a controlled amplifier ("complex" amplifier) being connected to each tap. The weighted tap values are summed in a series of summers $511_{1-n}$ one fewer in number than the number of taps.

During training of the equalizer, the known symbol sequence D(n) is fed into the input of the channel estimator at the same time the known sequence is scheduled to occur in the communications data stream r(n). As previously mentioned, during training, L=0 such that r(n)=r(n-L), identically representing the pulses carrying the known sequence. In the prior art, the synchronization word occurring at the beginning of each communications slot as shown in FIG. 4 has been used for equalizer training, being chosen so as to have good correlation properties. According to the present invention, both the synchronization pattern and the coded digital verification color code CDVCC are used for equalizer training. Referring briefly again to FIG. 5a therefore, SYNC and CDVCC are both indicated beneath D(n) as being input to the channel estimator for training. Such an arrangement is particularly advantageous because CDVCC occurs mid-burst at a time when the equalizer is likely to require retraining.

Referring again to FIG. 5b, the output of the transversal filter 506 is subtracted from the input signal r(n-L) resulting in an error signal $\epsilon(n-L)$. This error signal is used by an adaption algorithm indicated by block 515 to iteratively calculate successive sets of weights that model the impulse response of the communications channel with increasing accuracy. The adaption algorithm is executed by a digital signal processor (not shown), which may be the same as or different than the digital signal processor used to realize the Viterbi detector 503. A number of suitable adaption algorithms are well-known in the art and are described, for example, in Widrow & Stearns, "Adaptive Signal Processing", Prentice-Hall, 1985, and Haykin, "Adaptive Filler Theory", Prentice-Hall, 1986. In this manner, the equalizer converges so as to minimize the error signal $\epsilon$ and to accurately model the impulse response of the communications channel.

Two alternative retraining methods may be used in accordance with the present invention. According to a first alternative, the complex weights $C_0$-$C_n$ of the impulse response estimate are reset by grounding respective signal lines through a switch 517 under control of the digital signal processor such that training starts anew. According to a second alternative, the complex weights $C_0$-$C_n$ already obtained are kept but updated during retraining so as to take advantage of what may already be a good set of weights. This alternative is more complicated than the previous alternative for the following reason.

As previously described in relation to FIGS. 2 and 3, digital transmissions in a cellular mobile radiotelephone system wherein the present invention may be employed are modulated according to $\pi/4$-shifted differential phase shift keying wherein symbols are transmitted as the phase difference between a previous symbol and a next subsequent symbol. Accordingly, the sequence CDVCC that will be transmitted is known in terms of differential symbols only, not in terms of absolute symbols. In order to compare the known sequence CDVCC to the sampled absolute symbols r(n) in the channel estimator 505, CDVCC must first be translated to absolute symbols. In the previously described alternative wherein the weights are reset, an arbitrary starting phase (for example $\phi=0°$) may be assumed and an entirely new channel model may be derived. In order to keep the previously derived weights defining the channel impulse response estimate according to the second alternative, however, the starting phase cannot be arbitrarily assumed but must be correctly detected according to the symbol transmitted immediately previous to the beginning of the CDVCC field, i.e, the last symbol transmitted in the SACCH field of FIG. 4b or the first data field of FIG. 4c. Using this detected symbol to indicate the correct starting phase, CDVCC can then be translated to absolute symbols for input to the channel estimator. The danger exists, however, that the last symbol before CDVCC may be incorrectly detected. In this case, the adaption algorithm attempts to compensate for the unintentially introduced phase discrepancy by changing the weights defining the impulse response estimate. The result may be less favorable than if the weights had been reset altogether according to the first alternative.

One of the foregoing alternatives may be used in a system to the exclusion of the other in view of the characteristics of the particular system, or the two alternatives may be used in conjunction with one another, for example using the first alternative wherein the weights are reset when a bit-error rate is detected to be high and using the second alternative wherein the weights are retained when the bit-error rate is detected to be low.

In conjunction with the first retraining alternative (resetting the weights), it may be useful to conduct several retrainings to achieve better convergence as disclosed in Swedish Patent No. 8703407-0 to Björn Gudmundson. This technique involves buffering samples received during the expected occurrence of the known sequence for repeated use in retraining.

By retraining the equalizer during the middle of a transmission burst using CDVCC, better equalization and hence better speech quality can be achieved. Furthermore, since CDVCC is already transmitted for another purpose, no additional transmission overhead is incurred. Other known patterns besides CDVCC may also be used for retraining. The only requirement is that the pattern be known. The coded digital verification color code CDVCC is particularly well-suited for retraining since it is a recurrent pattern that is the same throughout the duration of a channel connection. Preferably, the pattern will be one that is already provided for a different purpose to avoid additional transmission overhead.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. In a digital cellular radiotelephone system having a base station and a mobile station exchanging communications bursts of a specified format, one of said base station and said mobile station having equalizer means for reducing inter-symbol interference during said communications bursts, a method of further reducing said inter-symbol interference, comprising the steps of:
   training said equalizer means using a known synchronization pattern occurring at the beginning of said specified format; and
   retraining said equalizer means during said communications bursts using a second known pattern provided according to said specified format, said second known pattern having an additional function besides retraining, wherein said second known pattern is a symbol field which is different from one base station to another and is known and constant during a transmission between said mobile station and said base station.

2. The method of claim 1 wherein said second known pattern occurs in each communications burst during a particular call.

3. The method of claim 2 wherein said second known pattern distinguishes a traffic channel carrying said particular call from other traffic channels.

4. The method of claim 3 wherein said second known pattern is a coded digital verification color code.

5. The method of claim 1 wherein said communications bursts are exchanged using a form of quadrature phase shift keying modulation.

6. The method of claim 5 wherein said modulation is $\pi/4$-DQPSK shifted, Differentially-Encoded Quadrature Phase Shift Keying modulation.

7. The method of claim 6 wherein said second known pattern is known in terms of differential symbols and said retraining step comprises:
   detecting a symbol value of a symbol immediately preceding said second known pattern;
   calculating a representation of said second known pattern in terms of absolute symbols after said symbol value of the symbol immediately preceding said second known pattern has been detected; and
   training said equalizer means using said calculated representation of said second known pattern.

8. The method of claim 6 wherein said retraining step comprises:
   resetting a set of weights used by said equalizer means; and
   deriving a new set of weights using said second known pattern.

9. In a digital cellular radiotelephone system having a base station and a mobile station exchanging communications bursts of a specified format, one of said base station and said mobile station having equalizer means for reducing inter-symbol interference during said communications bursts, an apparatus for further reducing said inter-symbol interference, comprising:
   means for training said equalizer means using a known synchronization pattern occurring at the beginning of said specified format;
   means for retraining said equalizer means during said communications bursts using a second known pattern provided according to said specified format, said second known pattern having an additional function besides retraining; and
   means for inserting said second known pattern in each communications bursts during a particular call.

10. The apparatus of claim 10 wherein said second known pattern distinguishes a traffic channel carrying said particular call from other traffic channels in said system.

11. The apparatus of claim 11 wherein said second known pattern is a coded digital verification color code.

12. The apparatus of claim 9 wherein said second known pattern is known in terms of differential symbols further comprising:
   means for modulating said communications bursts according to π/4-DOPSK, Differentially Encoded Quadrature Phase Shift Keying;
   said means for retraining comprising:
   means for detecting a symbol value of a symbol immediately preceding said second known pattern;
   means for calculating a representation of said second known pattern in terms of absolute symbols after said symbol value of the symbol immediately preceding said second known pattern has been detected; and
   means for training said equalizer means using said calculated representation of said second known pattern.

13. The apparatus of claim 9 wherein said means for retraining comprises:
   means for resetting a set of weights used by said equalizer means; and
   means for deriving a new set of weights using said second known pattern.

14. A method of improving the reception of a transmitted signal in a radiotelephone system including an equalizer, comprising the steps of:
   training said equalizer using a synchronization portion of said transmission having a data pattern chosen for its correlation properties; and
   retraining said equalizer using a portion of said signal, said signal having an additional function besides retraining, wherein said portion of said signal is a symbol field which is different from one base station to another and is known and constant during the transmission.

15. The method of claim 14 wherein said portion of said transmission transmitted for a different purpose is a channel-identifying portion of said transmission.

16. An apparatus for improving reception of a transmitted signal in a radiotelephone system including an equalizer comprising:
   means for training said equalizer using a synchronization portion of said transmission having a data pattern chosen for its correlation properties; and
   means for retraining said equalizer using a portion of said signal, said signal having an additional function besides retraining, wherein said portion of said signal is a symbol field which is different from one base station to another and is known and constant during the transmission.

17. The apparatus of claim 16 wherein said portion of said transmission transmitted for a different purpose is a channel-identifying portion of said transmission.

* * * * *

UNITED STATES PATENT AND TRADEMARK OFFICE
CERTIFICATE OF CORRECTION

| | |
|---|---|
| PATENT NO. | : 5,297,169 |
| DATED | : March 22, 1994 |
| INVENTOR(S) | : Tomas Bäckström et al. |

It is certified that error appears in the above-identified patent and that said Letters Patent is hereby corrected as shown below:

Column 11, claim 10,
Line 1, delete "claim 10" and insert -- claim 9 --.

Column 11, claim 11,
Line 1, delete "claim 11" and insert -- claim 10 --.

Signed and Sealed this

Fifth Day of March, 2002

*Attest:*

JAMES E. ROGAN
*Attesting Officer* — *Director of the United States Patent and Trademark Office*